US010936621B2

(12) United States Patent
Dwivedi et al.

(10) Patent No.: US 10,936,621 B2
(45) Date of Patent: *Mar. 2, 2021

(54) VISUALIZING CHANGES IN A MULTI-DIMENSIONAL DATASET USING THREE-DIMENSIONAL CUBES

(71) Applicant: International Business Machines Corporation, Armonk, NY (US)

(72) Inventors: Saurabh Dwivedi, Delhi (IN); Rahul Parashar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/250,753

(22) Filed: Jan. 17, 2019

(65) Prior Publication Data
US 2019/0155816 A1 May 23, 2019

Related U.S. Application Data

(63) Continuation of application No. 15/293,544, filed on Oct. 14, 2016, now Pat. No. 10,242,081.

(51) Int. Cl.
*G06F 16/26* (2019.01)
*G06F 16/25* (2019.01)
*G06F 16/28* (2019.01)
*G06F 16/22* (2019.01)

(52) U.S. Cl.
CPC ..........  *G06F 16/26* (2019.01); *G06F 16/2264* (2019.01); *G06F 16/254* (2019.01); *G06F 16/283* (2019.01)

(58) Field of Classification Search
None
See application file for complete search history.

(56) References Cited

U.S. PATENT DOCUMENTS 6,750,864 B1 * 6/2004 Anwar .................. G06T 11/206
 345/440
6,877,006 B1 4/2005 Vasudevan
(Continued)

OTHER PUBLICATIONS

List of IBM Patents or Patent Applications Treated as Related, Jan. 17, 2019, pp. 1-2.
(Continued)

*Primary Examiner* — Son T Hoang
(74) *Attorney, Agent, or Firm* — Robert A. Voigt, Jr.; Winstead PC

(57) ABSTRACT

A multi-dimensional dataset of discrete data, such as online analytical processing based multi-dimensional data, is received. The number of dimensions in the multi-dimensional dataset of discrete data is then identified. One or more levels of three-dimensional cubes of discrete data are then created equal to the number of dimensions in the multi-dimensional dataset divided by three rounded to the lowest positive integer. The discrete data of the one or more levels of three-dimensional cubes is encoded. A color palette is then associated with the encoded discrete data. As a result, a user is able to quantify and understand the effects to data in a multi-dimensional dataset from changes made in the system (e.g., adding/deleting/modifying business rules) in a more efficient and accurate manner.

20 Claims, 6 Drawing Sheets

(56) References Cited

U.S. PATENT DOCUMENTS

| | | | | |
|---|---|---|---|---|
| 8,364,724 B2* | 1/2013 | Stolte | ............... | G06F 16/211 |
| | | | | 707/805 |
| 9,031,900 B2 | 5/2015 | Albrecht et al. | | |
| 2005/0283494 A1* | 12/2005 | Colossi | ............... | G06F 16/283 |
| 2006/0206512 A1* | 9/2006 | Hanrahan | ............... | G06T 11/206 |
| 2012/0079431 A1* | 3/2012 | Toso | ............... | G06Q 40/06 |
| | | | | 715/836 |
| 2015/0007115 A1* | 1/2015 | Kleser | ............... | G06F 3/0482 |
| | | | | 715/854 |

OTHER PUBLICATIONS

Office Action for U.S. Appl. No. 15/874,667 dated Jul. 3, 2019, pp. 1-30.

List of IBM Patents or Patent Applications Treated as Related, Oct. 28, 2019, pp. 1-2.

* cited by examiner

VISUALIZING CHANGES IN A MULTI-DIMENSIONAL DATASET USING THREE-DIMENSIONAL CUBES

TECHNICAL FIELD

The present invention relates generally to analyzing data, and more particularly to visualizing changes in a multi-dimensional dataset (e.g., online analytical processing (OLAP) based multi-dimensional data) using three-dimensional cubes associated with a two-dimensional table or a one-dimensional straight line, if necessary.

BACKGROUND

Analyzing data differences due to changes made in the system is often very difficult, especially for multi-dimensional datasets, such as online analytical processing (OLAP) based multi-dimensional datasets. In computing, OLAP is an approach to answering multi-dimensional analytical queries swiftly. Typical applications of OLAP include business reporting for sales, marketing, management reporting, business processing management, budgeting and forecasting, financial reporting and similar areas.

Currently, in attempting to quantify or understand the effects to the multi-dimensional data from changes made in the system (e.g., using version 2 instead of version 1, adding/deleting/modifying business rules, month of January versus the month of April), the user will review and compare the data, such as comparing the data in two tables side by side. However, such a process is time-consuming and inefficient and perhaps error-prone in quantifying or understanding the effects to the data from changes made in the system.

SUMMARY

In one embodiment of the present invention, a method for visualizing changes in a multi-dimensional dataset comprises receiving a multi-dimensional dataset of discrete data. The method further comprises identifying a number of dimensions in the multi-dimensional dataset of discrete data. The method additionally comprises computing a number equal to the number of dimensions in the multi-dimensional dataset of discrete data divided by three. Furthermore, the method comprises creating one or more levels of three-dimensional cubes of discrete data equal to the number of number of dimensions in the multi-dimensional dataset divided by three rounded to a lowest positive integer. Additionally, the method comprises encoding the discrete data at each level of the one or more levels of three-dimensional cubes. In addition, the method comprises associating a color palette with the encoded discrete data.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for visualizing changes in a multi-dimensional dataset. In one embodiment of the present invention, a multi-dimensional dataset of discrete data, such as online analytical processing based multi-dimensional data, is received. The number of dimensions in the multi-dimensional dataset of discrete data is then identified. For example, if the multi-dimensional dataset contains data for the dimensions of products, time, stores and measures, then the number of dimensions contained in the multi-dimensional dataset is four. One or more levels of three-dimensional cubes of discrete data are then created equal to the number of dimensions in the multi-dimensional dataset divided by three rounded to the lowest positive integer. For instance, referring to the above example, if the number of dimensions contained in the multi-dimensional dataset is four, then the number of four divided by three rounded to the lowest positive integer is one. As a result, a single level of a three-dimensional cube of discrete data would be created. The discrete data of the one or more levels of three-dimensional cubes is encoded. A color palette is then associated with the encoded discrete data. As a result of the present invention, a user is able to quantify and understand the effects to data in a multi-dimensional dataset from changes made in the system (e.g., using version 2 instead of version 1, adding/deleting/modifying business rules, changes in the development model) in a more efficient and accurate manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
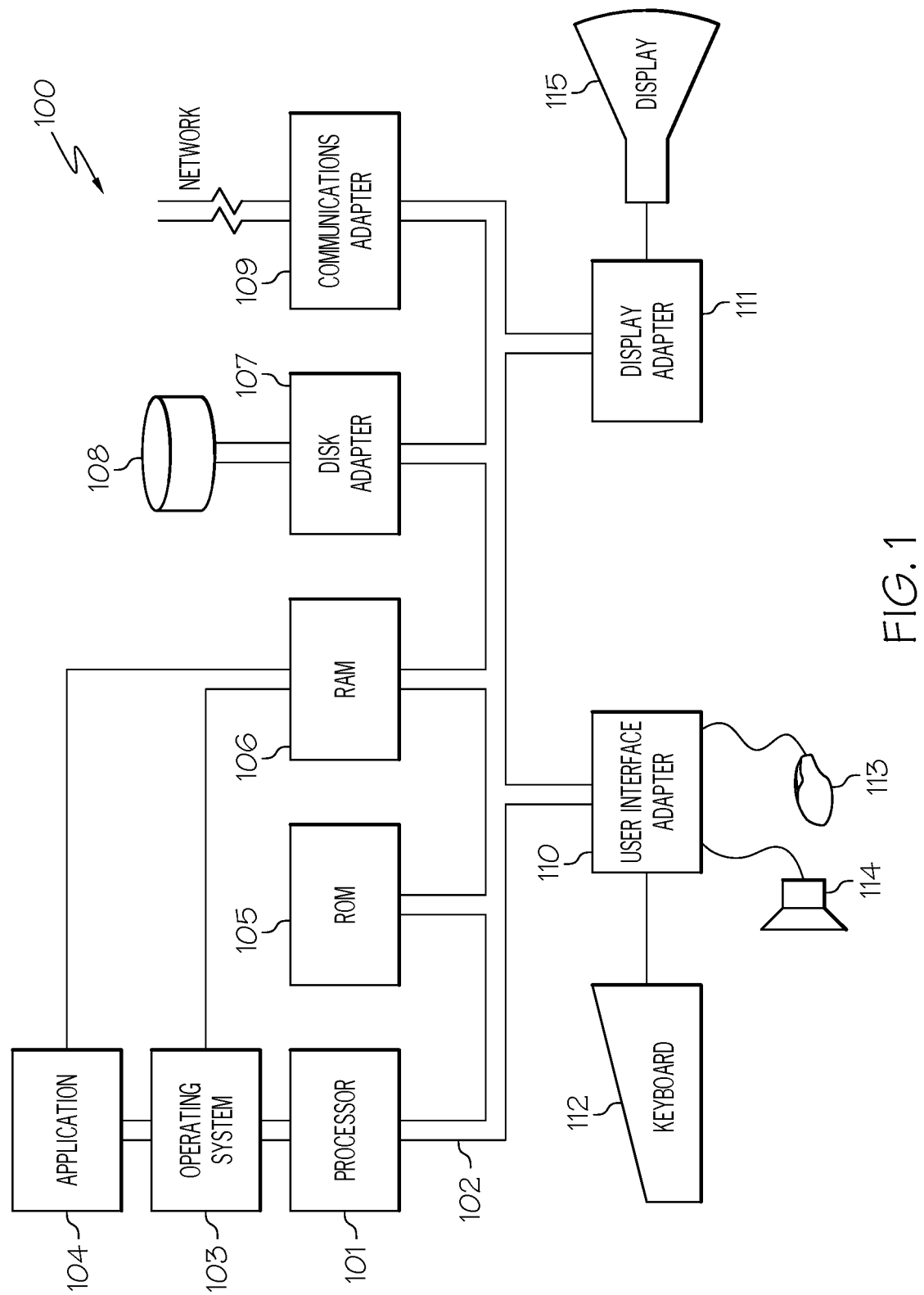
FIG. 1 illustrates an embodiment of the present invention of a hardware configuration of a computing device which is representative of a hardware environment for practicing the present invention.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), smartphone, laptop computer, mobile phone, navigation device, game console, desktop computer system, workstation, Internet appliance and the like) configured with the capability of visualizing changes in a multi-dimensional dataset (e.g., online analytical processing based multi-dimensional data). Referring to FIG. 1, computing device 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for visualizing changes in a multi-dimensional dataset as discussed further below in connection with FIGS. 2-8.

Referring again to FIG. 1, read-only memory ("ROM") 105 may be coupled to system bus 102 and include a basic input/output system ("BIOS") that controls certain basic functions of computing device 100. Random access memory ("RAM") 106 and disk adapter 107 may also be coupled to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for visualizing changes in a multi-dimensional dataset, as discussed further below in connection with FIGS. 2-8, may reside in disk unit 108 or in application 104.

Computing device 100 may further include a communications adapter 109 coupled to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, analyzing data differences due to changes made in the system is often very difficult, especially for multi-dimensional datasets, such as online analytical processing (OLAP) based multi-dimensional datasets. In computing, OLAP is an approach to answering multi-dimensional analytical queries swiftly. Typical applications of OLAP include business reporting for sales, marketing, management reporting, business processing management, budgeting and forecasting, financial reporting and similar areas. Currently, in attempting to quantify or understand the effects to the multi-dimensional data from changes made in the system (e.g., using version 2 instead of version 1, adding/deleting/modifying business rules, month of January versus the month of April), the user will review and compare the data, such as comparing the data in two tables side by side. However, such a process is time-consuming and inefficient and perhaps error-prone in quantifying or understanding the effects to the data from changes made in the system.

The principles of the present invention provide a means for quantifying and understanding the effects to data in a multi-dimensional dataset from changes made in the system by visualizing changes in the multi-dimensional dataset using one or more levels of three-dimensional cubes of discrete data along with an associated two-dimensional table or one-dimensional straight line, if necessary, as discussed below in connection with FIGS. 2-8. For example, by using the principles of the present invention, a user will be able to quantify and understand the effects to data, such as the change in the frequency or quantum of data, in a multi-dimensional dataset from changes made in the system (e.g., adding/deleting/modifying business rules, changes in the development model) in a more efficient and accurate manner. As an example, the present invention would be able to assist the user in better understanding and quantifying what part of the country was most affected by a sales tax increase on a set of products.

Figure 2:
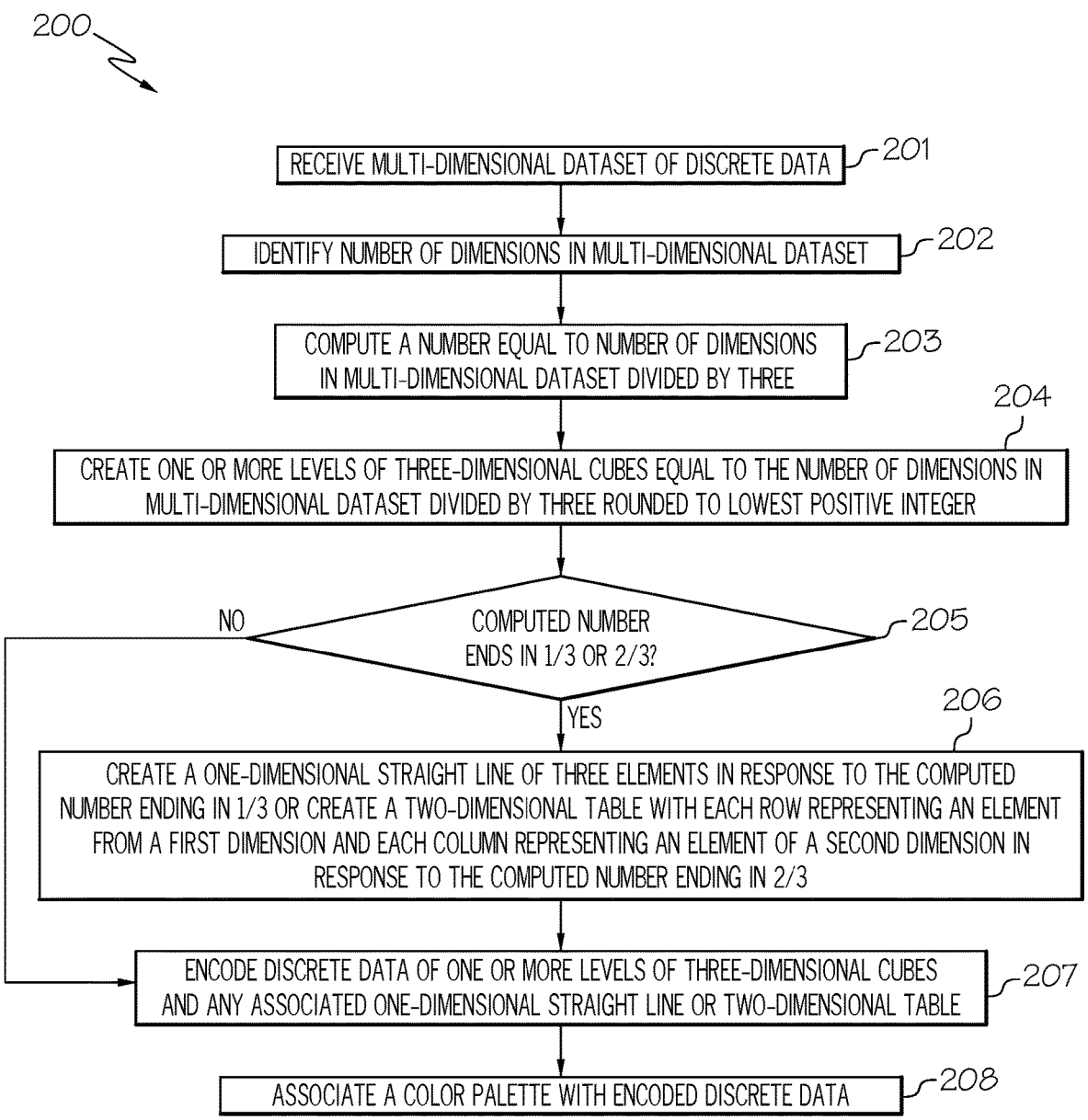
FIG. 2 is a flowchart of a method for visualizing changes in a multi-dimensional dataset in accordance with an embodiment of the present invention.
Figure 3:
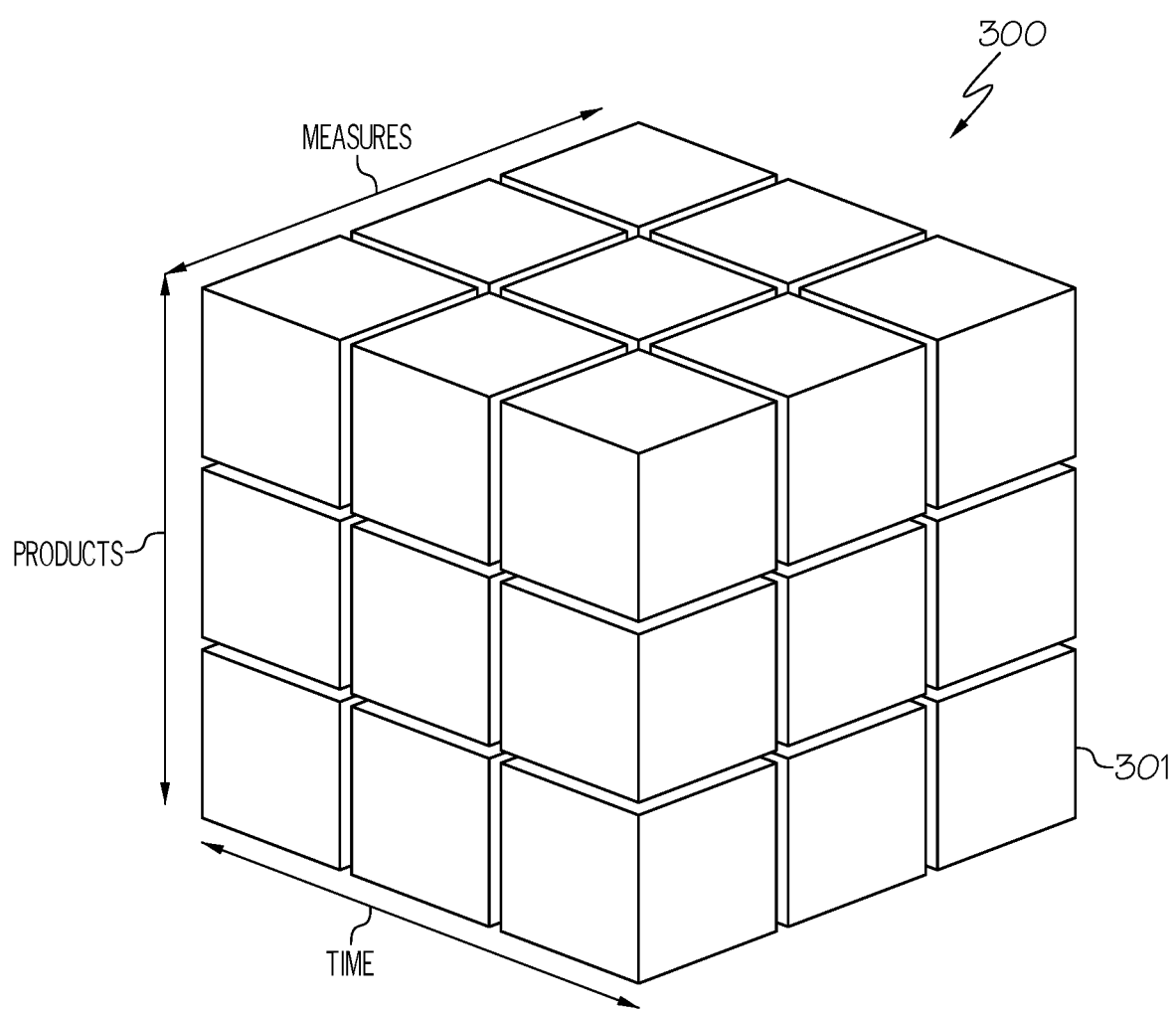
FIG. 3 illustrates a three-dimensional cube of discrete data with the dimensions of products, time and measures in accordance with an embodiment of the present invention.
Figure 4:
FIG. 4 illustrates a one-dimensional straight line of the fourth dimension of stores in accordance with an embodiment of the present invention.
Figure 5:
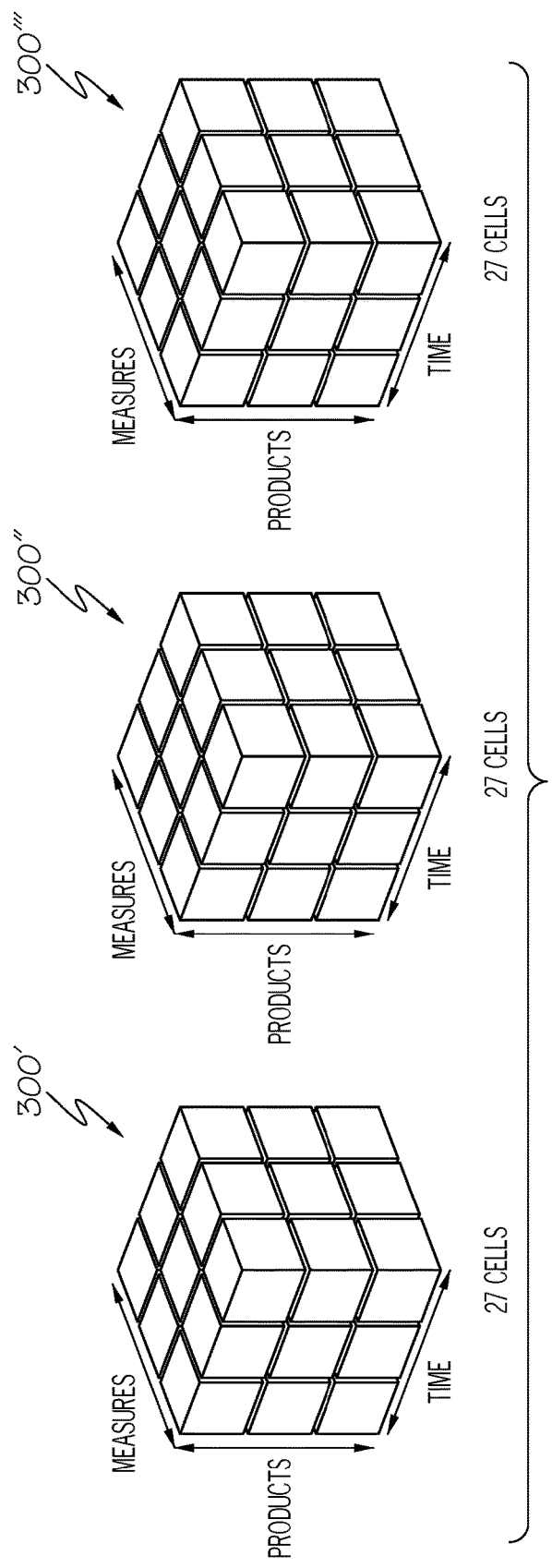
FIG. 5 graphically illustrates the number of cells in the 4 dimensional cube dataset by showing the 27 cells for each dimension of the three-dimensional cube in accordance with an embodiment of the present invention.
Figure 6:
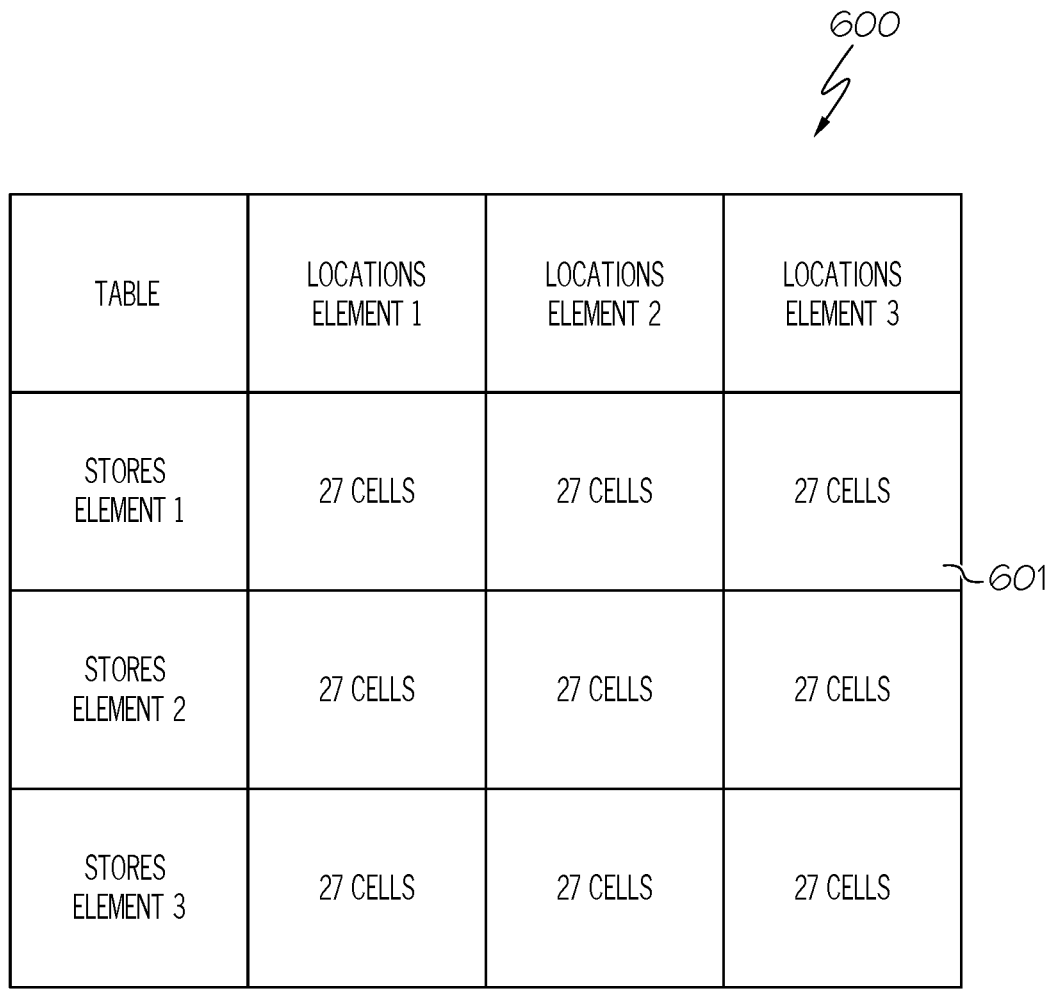
FIG. 6 illustrates a two-dimensional table of the fourth and fifth dimensions of stores and locations, respectively, in accordance with an embodiment of the present invention.
Figure 7:
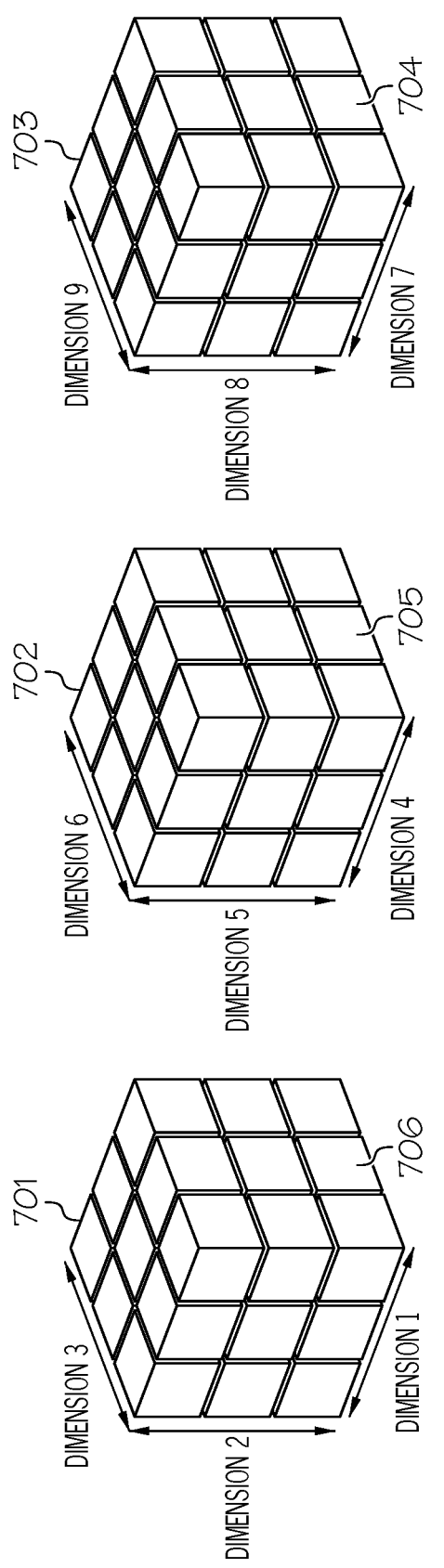
FIG. 7 illustrates three levels of a three-dimensional cube of discrete data in accordance with an embodiment of the present invention.
Figure 8:
FIG. 8 illustrates a one-dimensional straight line of the tenth dimension in accordance with an embodiment of the present invention.

FIG. 2 is a flowchart of a method for visualizing changes in a multi-dimensional dataset. FIG. 3 illustrates a three-dimensional cube of discrete data with the dimensions of products, time and measures. FIG. 4 illustrates a one-dimensional straight line of the fourth dimension of stores. FIG. 5 graphically illustrates the number of cells in the 4 dimensional cube dataset by showing the 27 cells for each dimension of the three-dimensional cube. FIG. 6 illustrates a two-dimensional table of the fourth and fifth dimensions of stores and locations, respectively. FIG. 7 illustrates three levels of a three-dimensional cube of discrete data. FIG. 8 illustrates a one-dimensional straight line of the tenth dimension.

As stated above, FIG. 2 is a flowchart of a method 200 for visualizing changes in a multi-dimensional dataset in accordance with an embodiment of the present invention.

Referring to FIG. 2, in conjunction with FIG. 1, in step 201, computing device 100 receives a multi-dimensional dataset of discrete data, such as online analytical processing based multi-dimensional data.

In step 202, computing device 100 identifies a number of dimensions in the multi-dimensional dataset of discrete data. For example, if the multi-dimensional dataset contains data for the dimensions of products, time, stores and measures, then the number of dimensions contained in the multi-dimensional dataset is four.

In step 203, computing device 100 computes the number equal to the number of dimensions in the multi-dimensional dataset divided by three. For example, if the number of dimensions contained in the multi-dimensional dataset is four, then computing device 100 computes the number 4/3 in step 203.

In step 204, computing device 100 creates one or more levels of three-dimensional cubes of discrete data equal to the number of dimensions in the multi-dimensional dataset divided by three rounded to the lowest positive integer. For instance, referring to the above example, if the number of dimensions contained in the multi-dimensional dataset is four, then the number of four divided by three rounded to the lowest positive integer is one. As a result, computing device 100 would create a single level of a three-dimensional cube of discrete data. In another example, if the number of dimensions contained in the multi-dimensional dataset is ten, then the number of ten divided by three rounded to the lowest positive integer is three. As a result, computing device 100 would create three levels of three-dimensional cubes of discrete data. In one embodiment, each level of the three-dimensional cubes contains three dimensions of discrete data.

In step 205, a determination is made by computing device 100 as to whether the number computed in step 203 ends in $1/3$ or $2/3$.

If the number computed in step 203 ends in $1/3$ or $2/3$, then, in step 206, computing device 100 creates a one-dimensional straight line of three elements containing one-dimension of discrete data in response to the computed number ending in $1/3$ or creates a two-dimensional table of cells with each row representing an element from a first dimension and each column representing an element of a second dimension in response to the computed number ending in $2/3$.

For example, suppose that the received multi-dimensional dataset is a four dimensional dataset of discrete data, such as data with the dimensions of products, time, stores and measures. Since the number of dimensions divided by three is 1 and $1/3$, computing device 100 will create one level of a three-dimensional cube of discrete data along with a one-dimensional straight line containing three elements as shown in FIGS. 3 and 4.

FIG. 3 illustrates a three-dimensional cube 300 of discrete data with the dimensions of products, time and measures in accordance with an embodiment of the present invention. As illustrated in FIG. 3, three-dimensional cube 300 contains cells 301 storing the discrete data.

FIG. 4 illustrates a one-dimensional straight line 400 of the fourth dimension of stores in accordance with an embodiment of the present invention. Referring to FIGS. 3 and 4, in one embodiment, the one-dimensional straight line of the fourth dimension of stores contains three elements 401. In one embodiment, the content of elements 401 of one-dimensional straight line 400 contains a pointer to three-dimensional cube 300, which contains the data for that particular store.

In one embodiment, each dimension in the multi-dimensional dataset of discrete data is represented by three elements/items/members. As a result, the multi-dimensional dataset of discrete data is represented by a total of $3^N$ total cells, where N is equal to the number of dimensions in the multi-dimensional dataset of discrete data. Hence, referring to the above example, if each dimension (four dimensions in the example) is represented by three elements/items/members, then the total cube will have $3^4$ (81) cells as shown in FIG. 5. It is noted that the principles of the present invention are not to be limited in scope to having each dimension in the multi-dimensional dataset of discrete data being represented by three elements/items/members. Instead, each dimension in the multi-dimensional dataset of discrete data may be represented by one or more elements/items/members. A person of ordinary skill in the art would be capable of applying the principles of the present invention to such implementations. Further, embodiments applying the principles of the present invention to such implementations would fall within the scope of the present invention.

FIG. 5 graphically illustrates the number of cells in the 4 dimensional cube dataset by showing the 27 cells for each dimension in space of the three-dimensional cube 300 (represented by cube 300' for the first dimension, cube 300'' for the second dimension and cube 300''' for the third dimension) in accordance with an embodiment of the present invention.

In another example, suppose that the received multi-dimensional dataset is a five dimensional dataset of discrete data, such as data with the dimensions of products, time, stores, measures and locations. Since the number of dimensions divided by three is 1 and $2/3$, computing device 100 will create one level of a three-dimensional cube of discrete data along with a two-dimensional table as shown in FIGS. 3 and 6.

As previously discussed, FIG. 3 illustrates a three-dimensional cube 300 of discrete data with the dimensions of products, time and measures in accordance with an embodiment of the present invention. FIG. 6 illustrates a two-dimensional table 600 of the fourth and fifth dimensions of stores and locations, respectively, in accordance with an embodiment of the present invention.

Referring to FIG. 6, in one embodiment, each row in table 600 represents an element from the fourth dimension (stores) and each column represents an element from the fifth dimension (locations). Each cell 601 in table 600 represents a combination of the fourth and fifth dimensions (stores and locations) and will act as a pointer to three-dimensional cube 300 comprised of the first, second and third dimensions (products, time and measures).

Since each dimension is represented by three elements/items/members in the exemplary embodiment, then the total cube (5 dimensional cube dataset), including the three-dimensional cube 300 and the two-dimensional table 600, will have $3^5$ (243) cells as illustrated in FIG. 6. Since each cell 601 in table 600 points to a possible number of 27 cells of three-dimensional cube 300, then there is a total of 243 cells as illustrated in FIG. 6.

It is noted that the principles of the present invention are not to be limited in scope to having each dimension of the three-dimensional cube 300 being represented by 27 cells based on each dimension of the multi-dimensional dataset being represented by three elements/items/members. Instead, each dimension of the three-dimensional cube 300 may be represented by a different number of cells, such as the first dimension having twenty cells, the second dimension having twenty-five cells and the third dimension having a single cell.

In a further example, suppose that the received multi-dimensional dataset is a ten dimensional dataset of discrete data. Since the number of dimensions divided by three is 3 and $1/3$, computing device 100 will create three levels of a three-dimensional cube of discrete data along with a one-dimensional straight line as shown in FIGS. 7 and 8.

FIG. 7 illustrates three levels of a three-dimensional cube of discrete data (identified by cubes 701, 702 and 703) in accordance with an embodiment of the present invention. Three-dimensional cube 701 is said to be the first level of a three-dimensional cube containing the discrete data for the first three dimensions, the first, second and third dimensions. Three-dimensional cube 702 is said to be the second level of a three-dimensional cube containing the discrete data for the second three dimensions, the fourth, fifth and sixth dimensions. Furthermore, three-dimensional cube 703 is said to be the third level of a three-dimensional cube containing the discrete data for the three dimensions, the seventh, eighth and ninth dimensions.

FIG. 8 illustrates a one-dimensional straight line 800 of the tenth dimension in accordance with an embodiment of the present invention. Referring to FIGS. 7 and 8, in one embodiment, each element 801 of one-dimensional straight line 800 is a pointer to a cell 704 in the lowest-level three-dimensional cube (in this case the third level three-dimensional cube 703 containing the discrete data for the three dimensions, the seventh, eighth and ninth dimensions). Each cell 704 in cube 703 will be a pointer to a cell 705 in the next highest-level three-dimensional cube (in this case the second level three-dimensional cube 702 containing the discrete data for the three dimensions, the fourth, fifth and sixth dimensions). Furthermore, each cell 705 in cube 704 will be a pointer to a cell 706 in the highest-level three-dimensional cube 701 (the first level three-dimensional cube 701 containing the discrete data for the three dimensions, the first, second and third dimensions). As a result, the 10 dimensional cube dataset includes a one-dimensional straight line 800 and three three-dimensional cubes 701, 702, 703, where the elements 801 of one-dimensional straight line 800 and cells 704, 705 of three-dimensional cubes 702, 703 contain pointers, whereas, cells 706 of the first level three-dimensional cube 701 will contain values (e.g., numeric values, string values).

Since each dimension is represented by three elements/items/members in the exemplary embodiment, then the total cube (10 dimensional cube dataset), including the three three-dimensional cubes 701, 702, 703 and the one-dimensional straight line 800, will have $3^{10}$ (59,049) cells.

Returning to FIG. 2, in conjunction with FIGS. 1 and 3-8, upon creating a one-dimensional straight line or a two-dimensional table or if the number computed in step 203 did not end in ⅓ or ⅔, then, in step 207, computing device 100 encodes the discrete data of the one or more levels of the three-dimensional cubes (e.g., three-dimensional cubes 701, 702, 703) and any associated one-dimensional straight line (e.g., one-dimensional straight line 800) or two-dimensional table (e.g., two-dimensional table 600). That is, in one embodiment, computing device 100 encodes the discrete data at each level of the three-dimensional cubes (e.g., three-dimensional cubes 701, 702, 703) and any associated one-dimensional straight line (e.g., one-dimensional straight line 800) or two-dimensional table (e.g., two-dimensional table 600). "Encoding," as used herein, refers to converting the discrete data into a proper range based discrete data so as to more easily identify the important data points or data sets.

In one embodiment, depending on the type of data contained in the cube dataset as well as the type of analysis to be performed on the data, various types of encoding functions could be used. For example, if the frequency of change in a set of numbers needs to be viewed, then histograms may be utilized. In another example, if the quantum of change in all the numbers needs to be viewed, then the data could be partitioned into various sets, where each set contains a number between a minimum and a maximum value.

In step 208, computing device 100 associates a color palette with the encoded data.

Since it may be difficult to identify important data points or data sets by presenting the data as a continuous color, the discrete data is encoded as discussed above, and later assigned a specific color (e.g., assign the color blue for data points between the values of x and y) so as to be able to easily analyze the data, such as analyzing data above or below a certain threshold as discussed below. As a result of the present invention, a user is able to quantify and understand the effects to data in a multi-dimensional dataset from changes made in the system (e.g., e.g., using version 2 instead of version 1, adding/deleting/modifying business rules, changes in the development model) in a more efficient and accurate manner.

In one embodiment, the discrete data that is encoded may be said to be "pseudo continuous" in that the difference between the values of the data may be small (i.e., the values of the various data may appear to be the same to the user). For example, if the sales data for various months were plotted on a graph, the bar graphs representing the sales data for these months may be appear to be the same height to the user and hence causing the data to appear continuous. Consequently, such data may be said to be "pseudo continuous." As a result, a transformation function can be applied to these values thereby creating "proper discrete data" from the pseudo continuous data to enable a user to quantify and understand the effects to data in a multi-dimensional dataset from changes made in the system (e.g., e.g., using version 2 instead of version 1, adding/deleting/modifying business rules, changes in the development model) in a more efficient and accurate manner.

As discussed above, computing device 100 associates a color palette with the encoded data. For example, suppose that the numbers with a value between −10 and 2000 changed due a change in a factor in the system (e.g., modification of a business rule). If a user would like to view the quantum of change in a single color, then the discrete data could be encoded by partitioning the data into various sets, such as a set with values between −10 and 2000, a set that contains numbers with values below −10 and a set that contains numbers with values greater than 2000. The partition that contains numbers between −10 and 2000 could then be associated with a color (e.g., blue) thereby enabling the user to more easily identify the quantum of change.

In another example, the user may want to further view the quantum of change within the partition containing the numbers between −10 and 2000. As a result, two partitions could be devised, where the first partition contains numbers between −10 and 1005 (1005 is the midpoint between the values of −10 and 2000) and the second partition contains numbers between 1006 and 2010. Each partition could then be associated with a color to enable the user to more easily identify the quantum of change within these ranges of values.

In one embodiment, when there are multiple levels of three-dimensional cubes (e.g., three-dimensional cubes 701, 702, 703), the color information in the lowest-level cube (e.g., three-dimensional cube 703) is transferred upwards to the "pointer" cubes (referring to those cubes with cells containing pointers to the next higher level cube) (e.g., three-dimensional cube 702) based on the numeric weight of the individual colors of each cell (e.g., cell 704) of the lowest-level cube (e.g., three-dimensional cube 703). Furthermore, in one embodiment, functional transformation could also be applied to the weights to increase the quantum of change transferred and the redistribution of the transformed weights could be done based on the color palette.

In one embodiment, once the three-dimensional cubes (e.g., three-dimensional cubes 701, 702, 703) have been color coded, they may be traversed where a single color palette acts as a guiding mechanism. In another embodiment, since the three-dimensional cubes (e.g., three-dimensional cubes 701, 702, 703) are represented in three-dimensions, there could be cube components or cells (e.g., cells 704, 705, 706) that are not visible in three-dimensions even after rotating the cube in 360 degrees. In such a scenario, each cell (e.g., cells 704, 705, 706) could transfer its color information to nearby cells as well. Once each cell (e.g., cells 704, 705, 706) transmits its color information to nearby cells and the calculated weighted information is kept within each cell, markers (such as in multiple of 3) could be utilized to identify the most important cells, such as by having those cells appear darker. As a result, a user could more easily analyze even the hidden cells.

Furthermore, markers can be utilized to assist the user in identifying the data of interest in other levels of the three-dimensional cubes. For instance, a user could review the data associated with a marker, such as on the highest level cube (e.g., three-dimensional cube 701). The user could then select the data marker which would result in the user being shown the details of the marker in the next lower-level cube (e.g., three-dimensional cube 702).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for visualizing changes in a multi-dimensional dataset, the computer program product comprising a computer readable storage medium having program code embodied therewith, the program code comprising the programming instructions for:
receiving the multi-dimensional dataset of discrete data;
identifying a number of dimensions in the multi-dimensional dataset of discrete data;
computing a number equal to the number of dimensions in the multi-dimensional dataset of discrete data divided by three;
creating one or more levels of three-dimensional cubes of discrete data equal to the number of dimensions in the multi-dimensional dataset divided by three rounded to a lowest positive integer;
dynamically encoding the discrete data at each level of the one or more levels of three-dimensional cubes using a particular encoding function based on a type of the discrete data and a type of analysis to be performed on the discrete data; and
associating a color palette with the encoded discrete data at each level of the one or more levels of three-dimensional cubes based at least on the particular encoding function.

2. The computer program product as recited in claim 1, wherein the program code further comprises the programming instructions for:
determining whether the computed number ends in $1/3$ or $2/3$.

3. The computer program product as recited in claim 2, wherein the program code further comprises the programming instructions for:
creating a one-dimensional straight line of three elements containing one-dimension of discrete data in response to the computed number ending in $1/3$.

4. The computer program product as recited in claim 2, wherein the program code further comprises the programming instructions for:
creating a two-dimensional table of cells with each row representing an element from a first dimension and each column representing an element of a second dimension in response to the computed number ending in $2/3$.

5. The computer program product as recited in claim 1, wherein the program code further comprises the programming instructions for:
encoding the discrete data at each level of the one or more levels of three-dimensional cubes and any associated one-dimensional straight lines or two-dimensional tables.

6. The computer program product as recited in claim 1, wherein the program code further comprises the programming instructions for:
associating the one or more levels of three-dimensional cubes of discrete data with a one-dimensional straight line of three elements containing one-dimension of discrete data in response to the computed number ending in $1/3$, wherein each of the three elements contains a pointer to a cell in one of the one or more levels of three-dimensional cubes.

7. The computer program product as recited in claim 1, wherein the program code further comprises the programming instructions for:
associating the one or more levels of three-dimensional cubes of discrete data with a two-dimensional table of cells in response to the computed number ending in $2/3$, wherein each row of the two-dimensional table represents an element from a first dimension and each column of the two-dimensional table represents an element from a second dimension, wherein each cell of the two-dimensional table represents a combination of elements from the first and second dimensions, wherein the combination of elements from the first and second dimensions is used as a pointer to a cell in one of the one or more levels of three-dimensional cubes.

8. The computer program product as recited in claim 1, wherein each dimension in the multi-dimensional dataset of discrete data is represented by three elements, wherein the multi-dimensional dataset of discrete data is represented by a total of 3N total cells, where N is equal to the number of dimensions in the multi-dimensional dataset of discrete data.

9. The computer program product as recited in claim 1, wherein color information from a lowest level three-dimensional cube is transferred upward to higher level three-dimensional cubes based on numeric weight of individual colors of each cell of the lowest level three-dimensional cube.

10. The computer program product as recited in claim 1, wherein color information of each cell of a three-dimensional cube is transmitted to nearby cells of the three-dimensional cube.

11. A system, comprising:
a memory for storing a computer program for visualizing changes in a multi-dimensional dataset; and
a processor coupled to the memory, wherein the processor is configured to execute program instructions of the computer program comprising:
receiving the multi-dimensional dataset of discrete data;
identifying a number of dimensions in the multi-dimensional dataset of discrete data;
computing a number equal to the number of dimensions in the multi-dimensional dataset of discrete data divided by three;
creating one or more levels of three-dimensional cubes of discrete data equal to the number of dimensions in the multi-dimensional dataset divided by three rounded to a lowest positive integer;
dynamically encoding the discrete data at each level of the one or more levels of three-dimensional cubes using a particular encoding function based on a type of the discrete data and a type of analysis to be performed on the discrete data; and associating a color palette with the encoded discrete data at each level of the one or more levels of three-dimensional cubes based at least on the particular encoding function.

12. The system as recited in claim 11, wherein the program instructions of the computer program further comprise:
determining whether the computed number ends in ⅓ or ⅔.

13. The system as recited in claim 12, wherein the program instructions of the computer program further comprise:
creating a one-dimensional straight line of three elements containing one-dimension of discrete data in response to the computed number ending in ⅓.

14. The system as recited in claim 12, wherein the program instructions of the computer program further comprise:
creating a two-dimensional table of cells with each row representing an element from a first dimension and each column representing an element of a second dimension in response to the computed number ending in ⅔.

15. The system as recited in claim 11, wherein the program instructions of the computer program further comprise:
encoding the discrete data at each level of the one or more levels of three-dimensional cubes and any associated one-dimensional straight lines or two-dimensional tables.

16. The system as recited in claim 11, wherein the program instructions of the computer program further comprise:
associating the one or more levels of three-dimensional cubes of discrete data with a one-dimensional straight line of three elements containing one-dimension of discrete data in response to the computed number ending in ⅓, wherein each of the three elements contains a pointer to a cell in one of the one or more levels of three-dimensional cubes.

17. The system as recited in claim 11, wherein the program instructions of the computer program further comprise:
associating the one or more levels of three-dimensional cubes of discrete data with a two-dimensional table of cells in response to the computed number ending in ⅔, wherein each row of the two-dimensional table represents an element from a first dimension and each column of the two-dimensional table represents an element from a second dimension, wherein each cell of the two-dimensional table represents a combination of elements from the first and second dimensions, wherein the combination of elements from the first and second dimensions is used as a pointer to a cell in one of the one or more levels of three-dimensional cubes.

18. The system as recited in claim 11, wherein each dimension in the multi-dimensional dataset of discrete data is represented by three elements, wherein the multi-dimensional dataset of discrete data is represented by a total of 3N total cells, where N is equal to the number of dimensions in the multi-dimensional dataset of discrete data.

19. The system as recited in claim 11, wherein color information from a lowest level three-dimensional cube is transferred upward to higher level three-dimensional cubes based on numeric weight of individual colors of each cell of the lowest level three-dimensional cube.

20. The system as recited in claim 11, wherein color information of each cell of a three-dimensional cube is transmitted to nearby cells of the three-dimensional cube.

* * * * *